(12) United States Patent
Matsumoto et al.

(10) Patent No.: US 8,547,970 B2
(45) Date of Patent: Oct. 1, 2013

(54) RECEIVER, RECEPTION METHOD AND PROGRAM

(75) Inventors: Hideyuki Matsumoto, Tokyo (JP);
Yuichi Mizutani, Tokyo (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 13/185,710

(22) Filed: Jul. 19, 2011

(65) Prior Publication Data

US 2012/0062803 A1 Mar. 15, 2012

(30) Foreign Application Priority Data

Sep. 10, 2010 (JP) .................................. 2010-202599

(51) Int. Cl.
*H04J 3/04* (2006.01)
(52) U.S. Cl.
USPC ............ 370/353; 370/384; 370/496; 370/522
(58) Field of Classification Search
None
See application file for complete search history.

(56) References Cited

U.S. PATENT DOCUMENTS

| 6,049,539 | A  | * | 4/2000 | Lee et al. ...................... 370/355 |
| 2002/0019988 | A1 |   | 2/2002 | Shirahama et al. |
| 2005/0163094 | A1 | * | 7/2005 | Okada et al. .................. 370/343 |
| 2007/0222649 | A1 | * | 9/2007 | Matsubayashi ................ 341/81 |
| 2009/0238260 | A1 | * | 9/2009 | Okamura et al. ........ 375/240.01 |
| 2010/0157831 | A1 | * | 6/2010 | Takeuchi et al. .............. 370/252 |
| 2010/0177251 | A1 |   | 7/2010 | Kimura et al. |

FOREIGN PATENT DOCUMENTS

EP 1 158 784 A2 11/2001

OTHER PUBLICATIONS

"Transmission System for Advanced Wide Band Digital Satellite Broadcasting (ARIB STD-B44)" Version 1.0, Jul. 29, 2009, 1-129.*
Machine Translation of ARIB STD-B44 (Sections 1, 2, 3.1, 3.2), generated Feb. 2013.*
Extended European Search Report issued Aug. 29, 2012, in European Patent Application No. 11178408.8.

* cited by examiner

*Primary Examiner* — Bob Phunkulh
*Assistant Examiner* — Salvador E Rivas
(74) *Attorney, Agent, or Firm* — Oblon, Spivak, McClelland, Maier & Neustadt, L.L.P.

(57) ABSTRACT

The present disclosure provides a receiver including a demodulation circuit adapted to demodulate data and control information attached to the data, and an extraction circuit adapted to extract some data from entire control information, wherein the demodulation circuit performs demodulation according to the extracted some data.

6 Claims, 10 Drawing Sheets

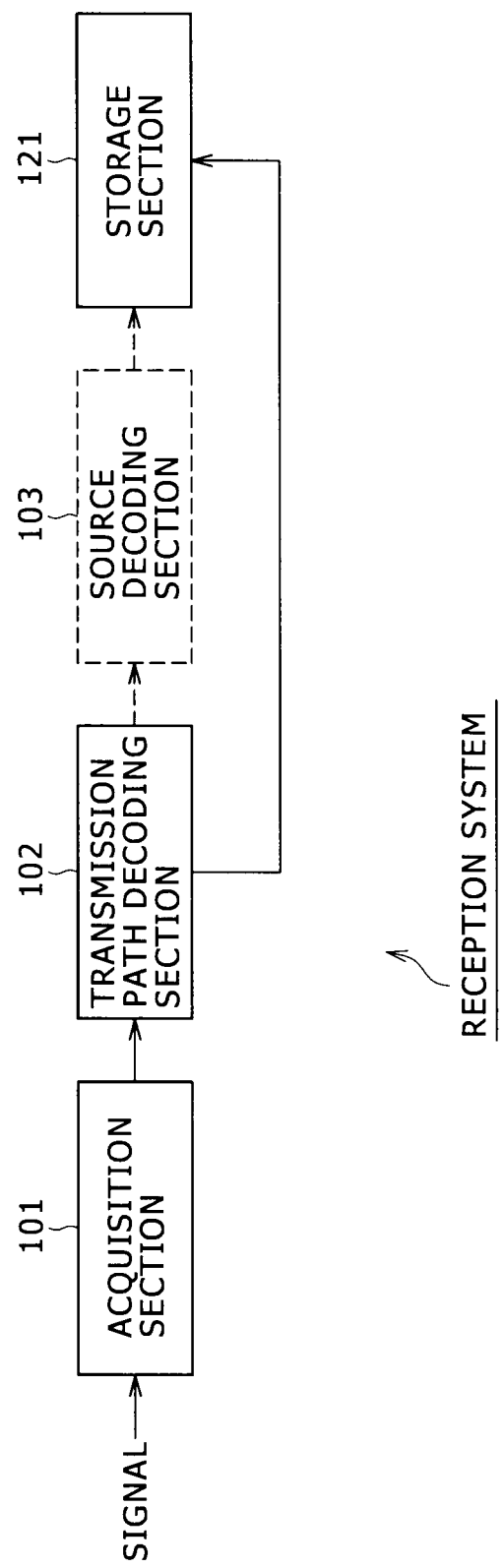

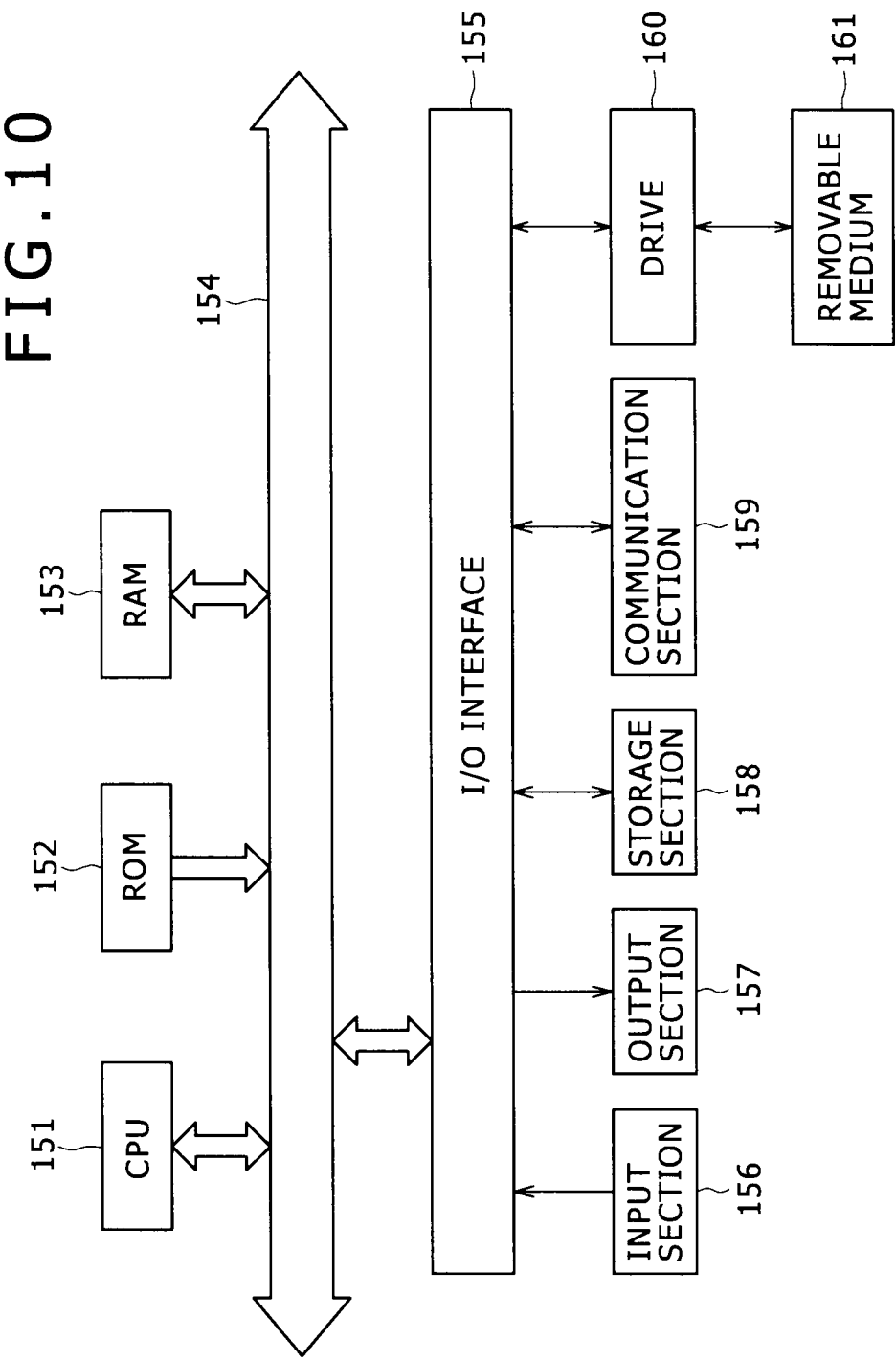

RECEIVER, RECEPTION METHOD AND PROGRAM

BACKGROUND

The present disclosure relates to a receiver, reception method and program, and more particularly, to a receiver, reception method and program for efficiently processing control information attached to data.

When transmitting moving image data such as moving images of a program, the transmitting device of a digital satellite broadcasting system codes the moving image data according to a coding scheme such as MPEG (Moving Picture Experts Group) and performs error correction coding on the data before transmission. Transmission and multiplexing information called TMCC (Transmission and Multiplexing Configuration Control) information is attached to moving image data. TMCC information includes transmission parameters.

TMCC information is necessary for a receiving device such as television receiver or PDA with television functionality to demodulate and reproduce the received data. For example, the receiving device stores the decoded TMCC information and reads this data in a single operation for reference when necessary.

SUMMARY

TMCC information is growing in size as a result, for example, of enhanced image quality of moving image data. In ISDB-S1, i.e., a digital satellite broadcasting standard, for example, the TMCC information is 384 bits in size. However, this size has been expanded to 9422 bits in ISDB-S2 (see "Transmission System for Advanced Wide Band Digital Satellite Broadcasting," ARIB STD-B44 Version 1.0, developed Jul. 29, 2009 by Association of Radio Industries and Businesses, h/html/overview/doc/2-STD-B44v1_0.pdf>).

In order to process TMCC information, it is common to store the entire TMCC information in a register and read the information in a single operation when necessary. However, the circuit itself adapted to store and read the TMCC information shows a tendency to become larger because of increasing size of TMCC information. On the other hand, the circuit cost is on its way to becoming no longer negligible.

Many bits of the TMCC information that has been expanded to about 10,000 bits in size are reserved bits. As a result, it is not necessary to store or read all the bits as of now.

The present disclosure has been made in light of the foregoing, and it is desirable to efficiently process control information attached to data.

A receiver according to an embodiment of the present disclosure includes a demodulation means and extraction means. The demodulation means demodulates data and control information attached to the data. The extraction means extracts some data from the entire control information. The demodulation means performs demodulation according to the some data.

The control information can include parameters for transmission of the data.

The data is multiplexed data obtained by multiplexing program data of a plurality of channels. The control information includes a parameter for multiplexing of the multiplexed data. The extraction means can extract the some data from the entire control information. The some data is larger in size than the parameters for transmission and that for multiplexing combined.

The receiver can further include a separation means adapted to separate the multiplexed data according to the parameter for multiplexing included in the extracted some data.

The control information is TMCC information defined in ARIB STD-B44. The transmission parameters and multiplexing parameter may be used as transmission mode/slot information included in the TMCC information.

The extraction means can extract the some data from the beginning of the control information by sequentially moving the section of data to be extracted.

The extraction means can extract, from the entire control information, data following the specified position whose size falls within the specified range, as the some data.

The receiver can still further include an error correction means adapted to perform error correction of the demodulated control information. In this case, the extraction means can extract the some data from the entire control information that has been subjected to error correction.

The extraction means can output the extracted some data to a circuit provided at a later stage of the signal path.

A reception method according to an embodiment of the present disclosure demodulates transmitted data and control information attached to the data, extracts some data from the entire control information, and demodulates the data and control information according to the extracted some data.

A program according to an embodiment of the present disclosure causes a computer to perform processes including demodulating transmitted data and control information attached to the data, extracting some data from the entire control information, and demodulating the data and control information according to the extracted some data.

In an embodiment of the present disclosure, transmitted data and control information attached to the data are demodulated. Further, some data is extracted from the entire control information, and the data and control information are demodulated according to the extracted some data.

The present disclosure allows for efficient processing of control information attached to data.

BRIEF DESCRIPTION OF THE DRAWINGS

FIG. 9 is a block diagram illustrating a configuration example of the reception system according to a third embodiment; and FIG. 10 is a block diagram illustrating a configuration example of a computer.

DETAILED DESCRIPTION OF THE PREFERRED EMBODIMENTS

Configuration Example of the Receiver

Figure 1:
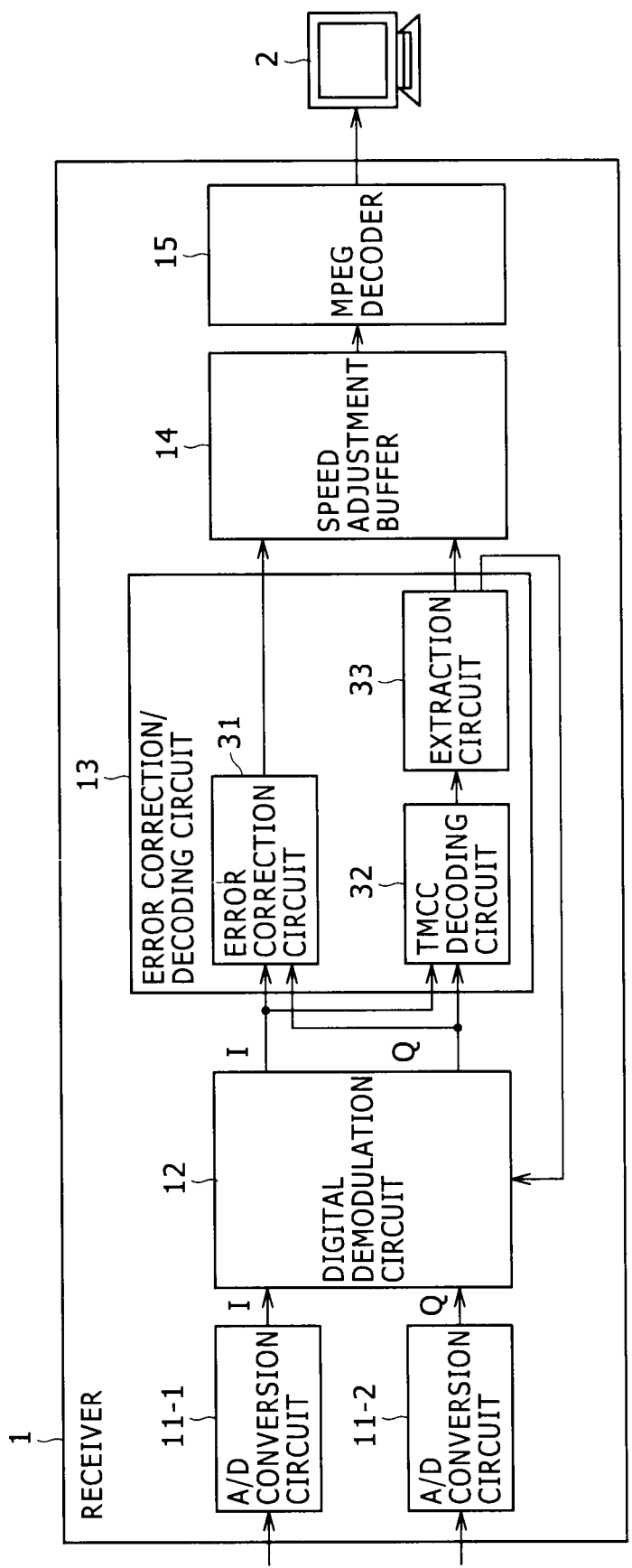
FIG. 1 is a block diagram illustrating a configuration example of a receiver according to an embodiment of the present disclosure.

FIG. 1 is a block diagram illustrating a configuration example of a receiver according to an embodiment of the present disclosure.

A receiver 1 is designed, for example, to demodulate and reproduce program data (image and audio) of digital satellite broadcasting. The image and audio of a program reproduced by the receiver 1 is output from a display device 2 connected to the receiver 1. The receiver 1 is provided outside the display device 2 in the example shown in FIG. 1. However, the receiver 1 may be provided inside the display device 2.

Digital satellite broadcasting received by the receiver 1 is, for example, advanced wide band digital satellite broadcasting defined in the ARIB STD-B44 standard. In advanced wide band digital satellite broadcasting defined in the ARIB STD-B44 standard, program image data is coded according to a predetermined coding scheme such as MPEG, and program data of a plurality of channels is multiplexed for broadcasting. TMCC information, i.e., control information for transmission and multiplexing, is attached to multiplexed data obtained by multiplexing the program data of the plurality of channels.

The receiver 1 includes A/D conversion circuits 11-1 and 11-2, digital demodulation circuit 12, error correction/decoding circuit 13, speed adjustment buffer 14 and MPEG decoder 15. A modulated signal received by the unshown antenna is fed to the A/D conversion circuits 11-1 and 11-2.

The A/D conversion circuit 11-1 converts the input modulated signal into a digital signal and outputs a digital in-phase component (I channel) signal. The A/D conversion circuit 11-2 converts the input modulated signal into a digital signal and outputs a digital quadrature component (Q channel) signal.

The digital demodulation circuit 12 digitally demodulates the digital signals supplied from the A/D conversion circuits 11-1 and 11-2 and outputs two pieces of data generated by digital demodulation, i.e., in-phase component data and quadrature component data. The digital demodulation performed by the digital demodulation circuit 12 is conducted according to the parameters supplied from an extraction circuit 33 of the error correction/decoding circuit 13.

As described later, of the transmission mode/slot information, i.e., the parameters included in TMCC information, two pieces of information are supplied from the extraction circuit 33. One of the two pieces of information is that indicating the modulation scheme of the main transmission signal (multiplexed data signal). The other piece of information is that indicating the coding rate of inner error correction coding. Information indicating the modulation scheme supplied from the extraction circuit 33 is used by the digital demodulation circuit 12, for example, to determine the demodulation scheme for digital demodulation. On the other hand, information indicating the coding rate is used by the digital demodulation circuit 12, for example, to determine the arrangement of signal points in the IQ plane.

The error correction/decoding circuit 13 includes an error correction circuit 31, TMCC decoding circuit 32 and the extraction circuit 33. The two pieces of data, i.e., in-phase component data and quadrature component data output from the digital demodulation circuit 12, are fed to both of the error correction circuit 31 and TMCC decoding circuit 32.

The error correction circuit 31 generates multiplexed data as a main transmission signal based on the in-phase component data and quadrature component data supplied from the digital demodulation circuit 12, performing error correction of the multiplexed data. In advanced wide band digital satellite broadcasting defined in the ARIB STD-B44 standard, every predetermined unit of the multiplexed data has an LDPC (Low Density Parity Check) code attached thereto as an inner code and a BCH (Bose-Chaudhuri-Hocquenghem) code attached thereto as an outer code. The error correction circuit 31 performs error correction of the multiplexed data using these error correction codes. The error correction circuit 31 outputs the multiplexed data obtained by the error correction to the speed adjustment buffer 14.

The TMCC decoding circuit 32 generates TMCC information and performs error correction of the TMCC information as a decoding process based on the in-phase component data and quadrature component data supplied from the digital demodulation circuit 12.

The TMCC information is transmitted in predetermined discrete units. Further, the TMCC information has an LDPC code attached thereto as an inner code and a BCH code attached thereto as an outer code as does the multiplexed data. The TMCC decoding circuit 32 collects the information transmitted in discrete units, thus generating the TMCC information and performing error correction of the generated TMCC information.

The TMCC decoding circuit 32 outputs the TMCC information obtained by the error correction. The error correction codes attached to the TMCC information are used for error correction of the entire TMCC information. Therefore, the TMCC decoding circuit 32 generates the entire TMCC information. When the error correction of the entire TMCC information is completed, the TMCC information is sequentially output starting, for example, with the first piece of information. The TMCC information is transmitted at predetermined intervals. The TMCC decoding circuit 32 repeatedly outputs the TMCC information.

The extraction circuit 33 extracts some information from the entire TMCC information and stores that information. The extraction circuit 33 has a register adapted to store the some information extracted from the entire TMCC information.

Figure 2:
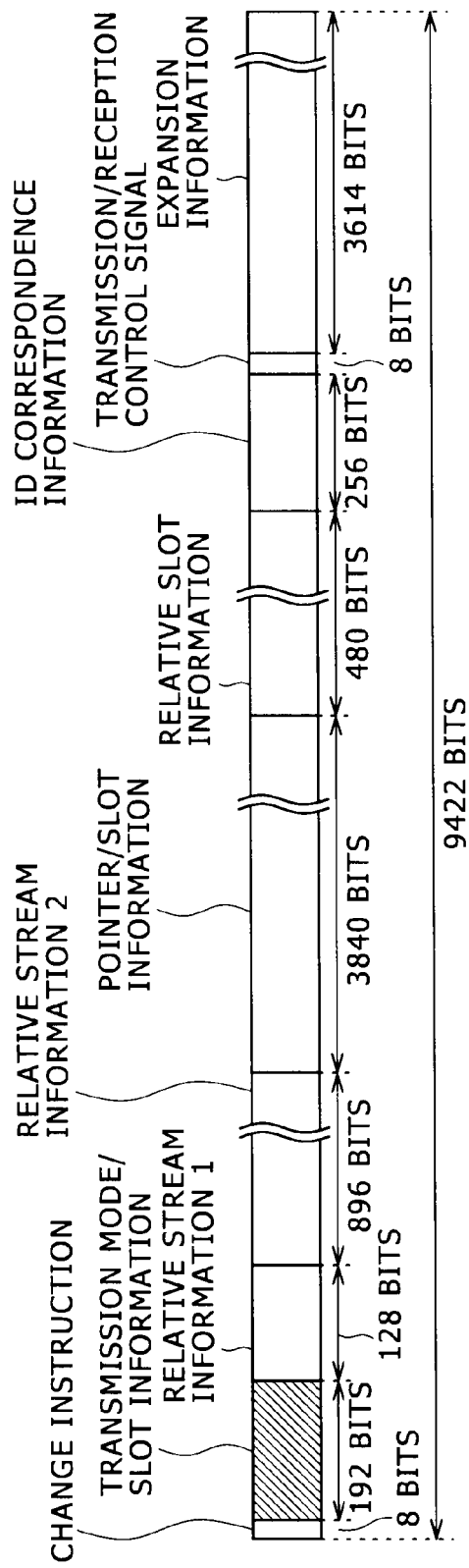
FIG. 2 is a diagram illustrating an example of extraction of information by an extraction circuit.

FIG. 2 is a diagram illustrating an example of extraction of information by the extraction circuit 33.

As illustrated in FIG. 2, the TMCC information is 9422 bits in total size. The TMCC information includes an 8-bit change instruction, 192-bit transmission mode/slot information, 128-bit relative stream information 1 (stream type/relative stream information) and 896-bit relative stream information 2 (packet type/relative stream information). The TMCC information also includes 3840-bit pointer/slot information, 480-bit relative slot information (relative stream/slot information), 256-bit ID correspondence information (relative stream/transmission stream ID correspondence information), 8-bit transmission/reception control information and 3614-bit expansion information.

The transmission mode/slot information included in the TMCC information is made up of information indicating the modulation scheme of the main transmission signal, that indicating the coding rate of inner error correction coding, that indicating the satellite output backoff and that indicating the number of assigned slots. The information indicating the modulation scheme of the main transmission signal, that indicating the coding rate of inner error correction coding and that indicating the satellite output backoff correspond to the transmission parameters. The information indicating the number of assigned slots corresponds to the multiplexing parameter.

The main transmission signal is formed by a collection of predetermined signal units called "slots." The information indicating the number of assigned slots shows the assignment of program data of which channel to which slot.

The extraction circuit 33 extracts the shaded transmission mode/slot information from the entire TMCC information that is sequentially supplied starting with the first bit, storing the information in the register. The transmission mode/slot information is the minimum information necessary to display the image of a program based on the transmitted multiplexed data. The information other than the transmission mode/slot information in the TMCC information supplied from the TMCC decoding circuit 32 is deleted, for example, by the extraction circuit 33.

The extraction circuit 33 outputs, of the parameters included in the transmission mode/slot information stored in the register, two pieces of information i.e., the information indicating the modulation scheme of the main transmission signal and that indicating the coding rate of inner error correction coding, to the digital demodulation circuit 12. The extraction circuit 33 also outputs the information indicating the number of assigned slots to the speed adjustment buffer 14. The TMCC information parameters are output, for example, each time the reception channels are changed.

This makes it possible to reduce the register capacity as compared to that necessary to store the entire TMCC information in the register and read the information in a single operation when an instruction is given to change the channels, thus contributing a smaller circuit scale. Further, of the entire TMCC information, only the information necessary to display the image of the program is read, thus contributing to efficient reading of information.

Not only the information indicating the modulation scheme of the main transmission signal and that indicating the coding rate of inner error correction coding but also other parameters included in the transmission mode/slot information may be output to the digital demodulation circuit 12. Alternatively, not only the information indicating the number of assigned slots but also other parameters included in the transmission mode/slot information may be output to the speed adjustment buffer 14.

Figure 3:
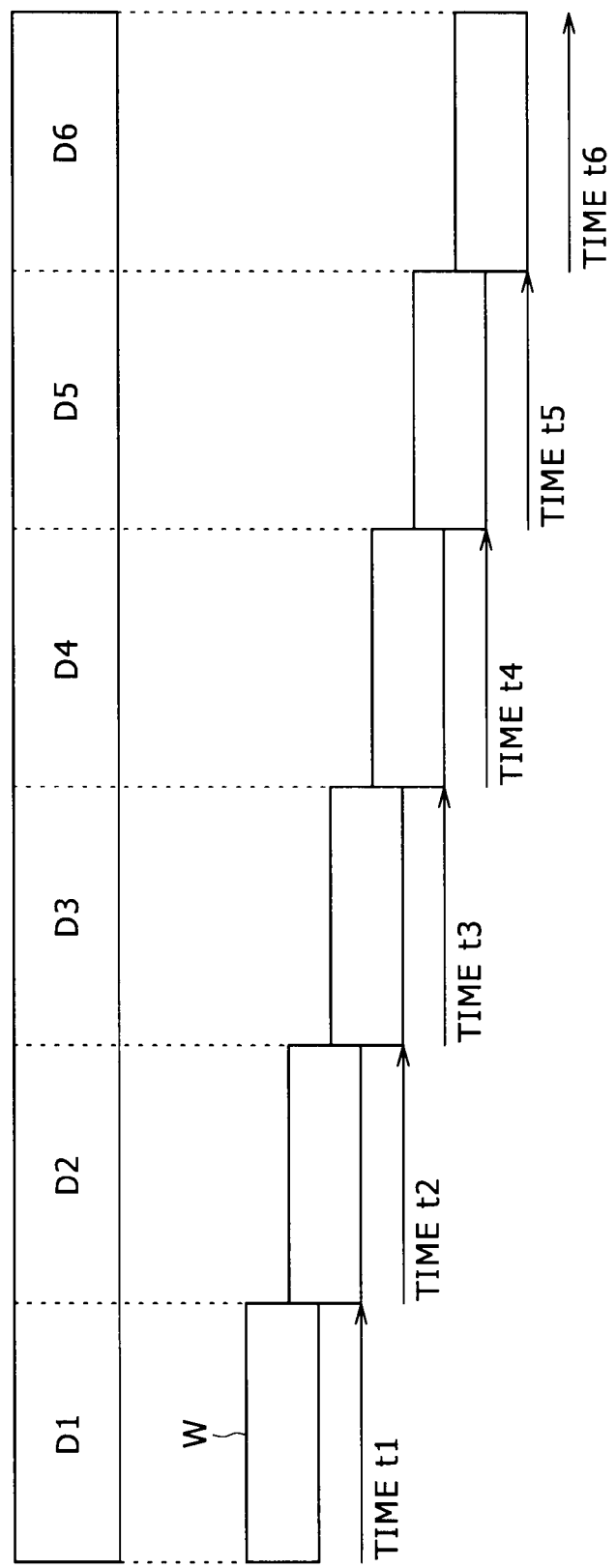
FIG. 3 is a diagram illustrating another example of extraction of information by the extraction circuit.

FIG. 3 is a diagram illustrating another example of extraction of information by the extraction circuit 33.

The extraction circuit 33 sets up a window W of a fixed width by sequentially moving the target position, thus extracting the information falling within the range of the window W from the entire TMCC information. Each time the extraction circuit 33 extracts some information by setting up the window W, the extraction circuit 33 stores the extracted information in the register by overwriting the information stored at that moment (information extracted at the immediately previous time) with the extracted information.

In the example shown in FIG. 3, information D1, i.e., a part of the TMCC information, is extracted at time t1, and information D2, i.e., another part of the TMCC information, is extracted at time t2. Further, information D3, i.e., still another part of the TMCC information, is extracted at time t3, and information D4, i.e., still another part of the TMCC information, is extracted at time t4. Still further, information D5, i.e., still another part of the TMCC information, is extracted at time t5, and information D6, i.e., still another part of the TMCC information, is extracted at time t6.

The width (size) of the window W is larger in size than the transmission mode/slot information, but smaller in size than the entire TMCC information which is 9421 bits in size.

When storing the transmission mode/slot information in the register, the extraction circuit 33 reads the transmission mode/slot information from the register and outputs the parameters included in this information to the digital demodulation circuit 12 and speed adjustment buffer 14 as described above.

The circuit scale can also be reduced as compared to that necessary to store the entire TMCC information by moving the target position and sequentially reading different pieces of information as illustrated in FIG. 3 rather than reading the same piece of information at all times as illustrated in FIG. 2.

Referring back to the description of FIG. 1, the speed adjustment buffer 14 stores a TS packet making up the multiplexed data supplied from the error correction circuit 31 of the error correction/decoding circuit 13. The speed adjustment buffer 14 separates the TS packet including the program data of the reception channel based on the information indicating the number of assigned slots supplied from the extraction circuit 33. The speed adjustment buffer 14 adjusts the data rate to bring it into agreement with the transmission data rate, outputting the separated TS packet.

The MPEG decoder 15 decodes the TS packet supplied from the speed adjustment buffer 14, outputting the program data of the channel being received obtained by the decoding to the display device 2.

[Operation of the Receiver]

A description will be given here of the operation of the receiver 1 with reference to the flowchart shown in FIG. 4.

Figure 4:
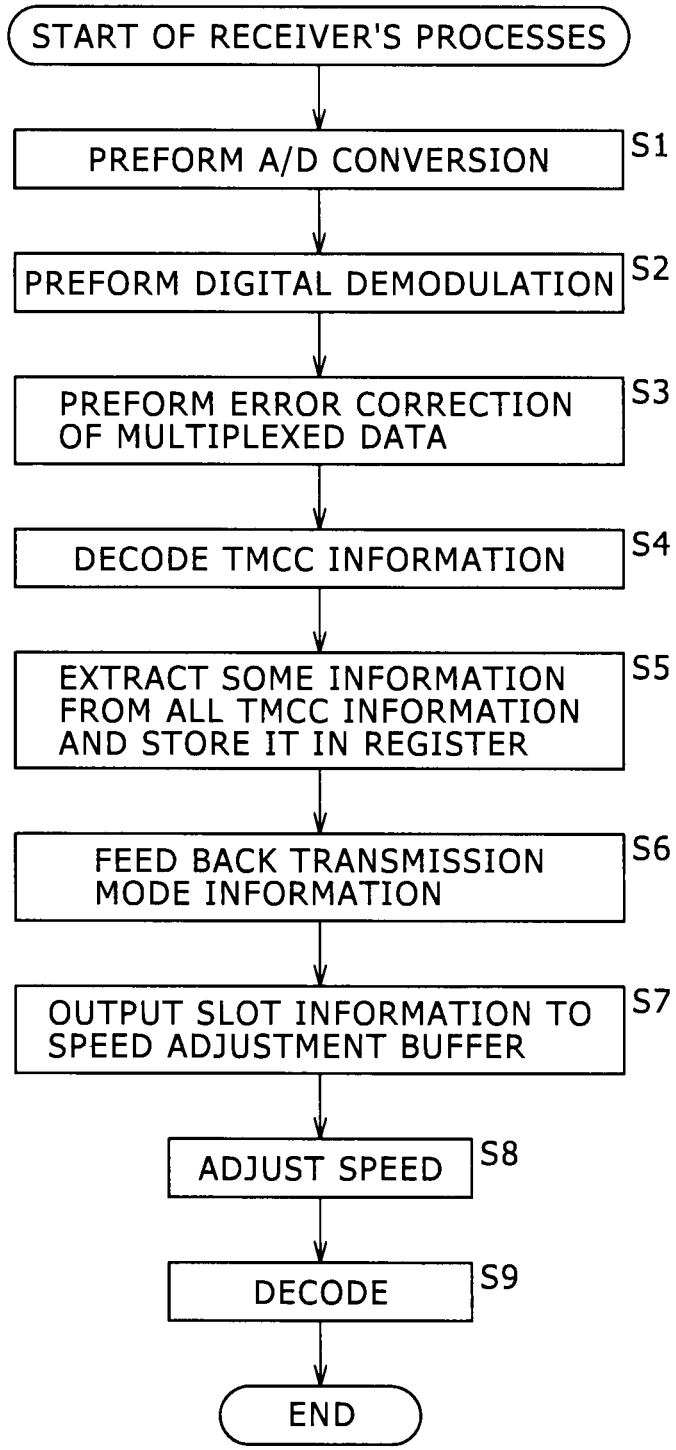
FIG. 4 is a flowchart describing the operation of the receiver.

The process steps shown in FIG. 4 are performed concurrently with or before or after other process steps as appropriate.

In step S1, the A/D conversion circuits 11-1 and 11-2 convert the input modulated signal into digital signals.

In step S2, the digital demodulation circuit 12 digitally demodulates the digital signals, obtained by the A/D conversion, according to the TMCC information parameters supplied from the extraction circuit 33.

In step S3, the error correction circuit 31 of the error correction/decoding circuit 13 generates multiplexed data based on the data obtained by the digital demodulation, performing error correction of the multiplexed data.

In step S4, the TMCC decoding circuit 32 decodes the TMCC information based on the data obtained by the digital demodulation. That is, the TMCC decoding circuit circuit 32 generates TMCC information based on the data obtained by the digital demodulation, performing error correction of the generated TMCC information.

In step S5, the extraction circuit 33 extracts some information from the entire TMCC information that has been subjected to the error correction, storing the extracted information in the register. The extraction of some information from the entire TMCC information is conducted as described with reference to FIG. 2 or 3.

In step S6, the extraction circuit 33 reads the information indicating the modulation scheme of the main transmission signal and that indicating the coding rate of inner error correction coding, i.e., transmission mode information, from the register, feeding back these pieces of information to the digital demodulation circuit 12.

In step S7, the extraction circuit 33 reads the information indicating the number of assigned slots, i.e., slot information, from the register, outputting the information to the speed adjustment buffer 14.

In step S8, the speed adjustment buffer 14 separates the TS packet including the reception channel data from the TS packet making up the multiplexed data based on the information indicating the number of assigned slots supplied from the extraction circuit 33. The speed adjustment buffer 14 adjusts the data rate to bring it into agreement with the transmission data rate, outputting the separated TS packet.

In step S9, the MPEG decoder 15 decodes the TS packet supplied from the speed adjustment buffer 14, outputting the program data of the channel being received to the display device 2.

As a result of the above, the TMCC information can be read in an efficient manner.

Modification Example

Figure 5:
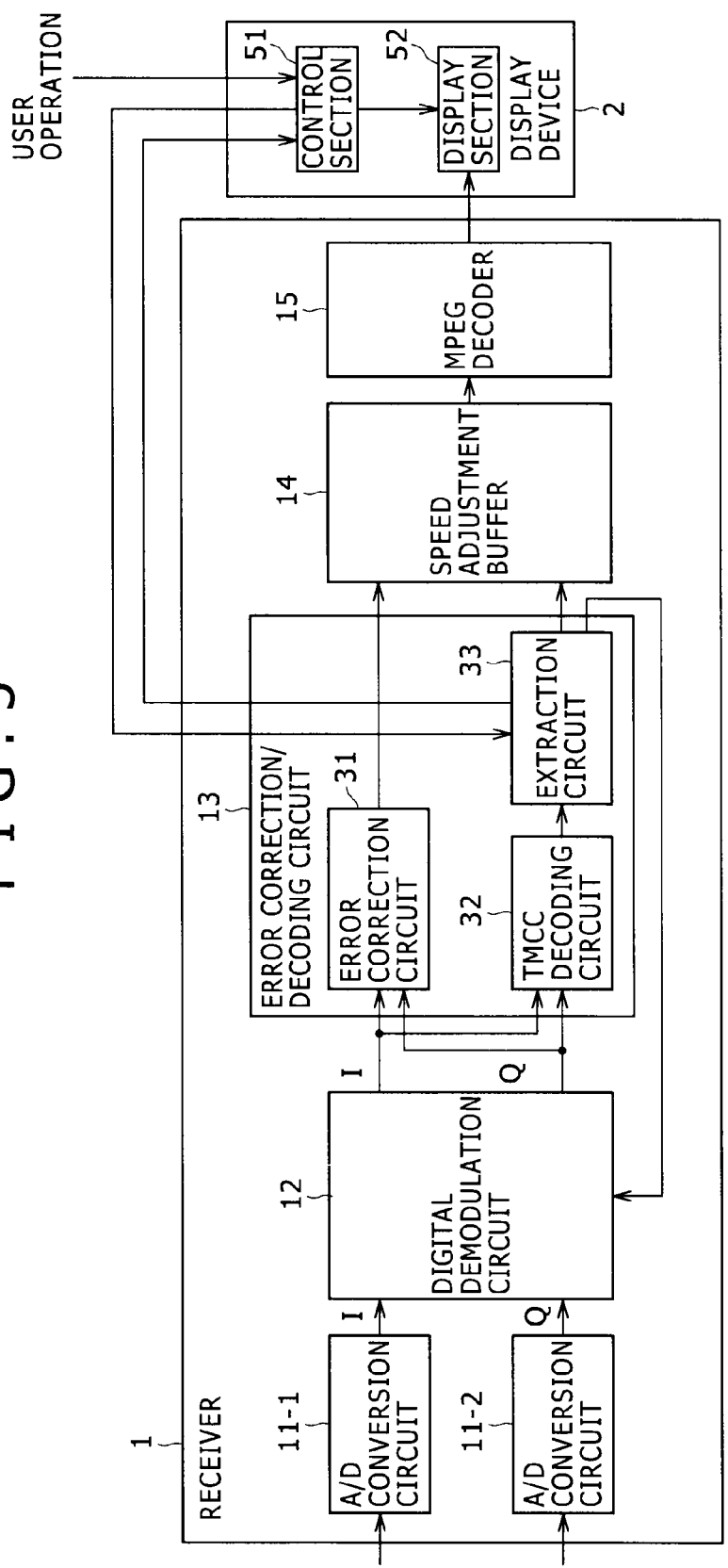
FIG. 5 is a block diagram illustrating another configuration example of the receiver.

FIG. 5 is a block diagram illustrating another configuration example of the receiver 1.

The configuration of the receiver 1 shown in FIG. 5 differs from that shown in FIG. 1 in that the TMCC information parameters are supplied directly from the extraction circuit 33 to the display device 2 and that information is fed from the display device 2 to the extraction circuit 33. The other configurations are identical to those described above in all respects. A redundant description will be omitted as appropriate.

The extraction circuit 33 sets the start position and range of some information to be extracted from the TMCC information according to the information supplied from a control section 51 of the display device 2 provided at a later stage of the signal path. The information indicating the extraction start position and that indicating the range are supplied from the control section 51.

Figure 6:
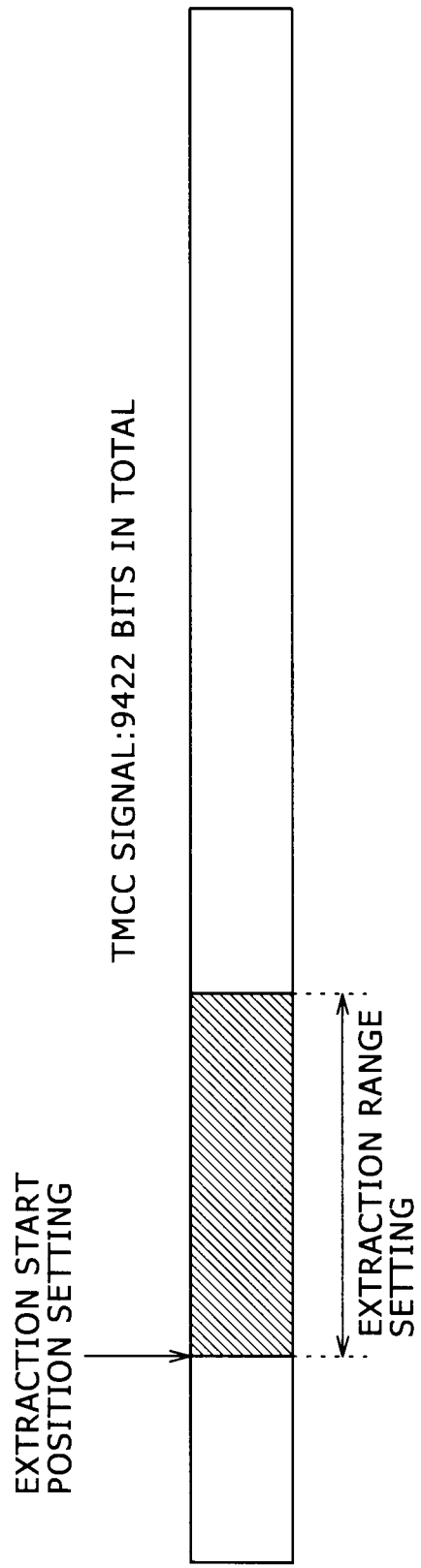
FIG. 6 is a diagram illustrating still another example of extraction of information by the extraction circuit.

FIG. 6 is a diagram illustrating still another example of extraction of information by the extraction circuit 33.

As shaded in FIG. 6, the extraction circuit 33 sets the predetermined position of the TMCC information as the extraction start position and the range extending from the start position to a later position distant by the predetermined size from the start position as the extraction range. The extraction range (size) is, for example, equal to or greater than 192 bits, i.e., the size of the transmission mode/slot information, and smaller than 9421 bits, i.e., the size of the entire TMCC information.

The extraction circuit 33 extracts the information falling within the extraction range from the entire TMCC information, storing the extracted information by overwriting the information stored at that moment with the extracted information. The information supplied from the TMCC decoding circuit 32 falling outside the extraction range is deleted, for example, by the extraction circuit 33.

When extracting the transmission mode/slot information according to the above specifications and storing it in the register, the extraction circuit 33 outputs the information included in the transmission mode/slot information to the digital demodulation circuit 12 and speed adjustment buffer 14 as described above.

Further, the extraction circuit 33 outputs the information, extracted from the entire TMCC information according to the specifications from the control section 51, to the control section 51.

The control section 51 of the display device 2 is implemented, for example, by the execution of the predetermined program by the unshown CPU of the display device 2. When the user of the display device 2 instructs that the details of the parameters included in the TMCC information should be displayed, the control section 51 outputs the information indicating the extraction start position and that indicating the extraction range to the extraction circuit 33 so that the information falling within the range including the user-specified information is extracted. The control section 51 outputs the information supplied from the extraction circuit 33 to a display section 52, thus allowing for the user-specified information to be displayed.

This makes it possible for the user to specify a given parameter and display the details of that parameter. Even in this case, the entire TMCC information is not read, thus contributing to efficient reading of the TMCC information.

As described above, it is possible to specify the start position and range of the information to be extracted from the entire TMCC information. Alternatively, it is possible to use a fixed extraction range and specify only the start position of the information to be extracted. Still alternatively, it is possible to use a fixed start position and specify only the extraction range.

It should be noted that it is also possible to supply the entire TMCC information to the control section 51 by specifying the beginning of the TMCC information as the extraction start position and specifying 9422 bits as the extraction range. In this case, a register capable of storing at least 9422 bits of information is provided in the extraction circuit 33.

A case has been described above in which the information extracted by the extraction circuit 33 is supplied to the digital demodulation circuit 12 and speed adjustment buffer 14. Alternatively, however, it is possible to supply the parameters included in the TMCC information to the MPEG decoder 15 or to other section at a later stage than the MPEG decoder 15.

On the other hand, a description has been given above of the processing of the TMCC information transmitted in advanced wide band digital satellite broadcasting defined in the ARIB STD-B44 standard. However, the processing of the TMCC information performed by the extraction circuit 33 as described above is applicable to the processing of a variety of information transmitted in other broadcasting systems.

Configuration Example of the Reception System

Figure 7:
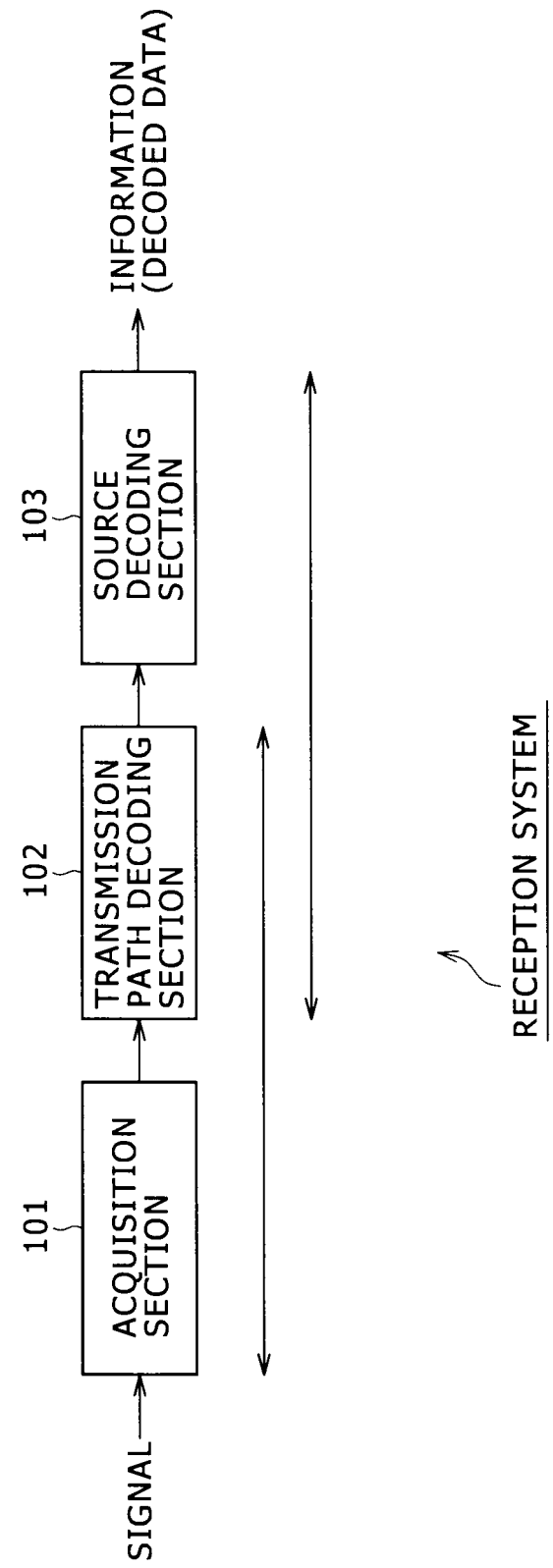
FIG. 7 is a block diagram illustrating a configuration example of a reception system according to a first embodiment.

FIG. 7 is a block diagram illustrating a configuration example of a reception system according to a first embodiment to which the receiver 1 is applied.

The reception system shown in FIG. 7 includes an acquisition section 101, channel decoding section 102 and source decoding section 103.

The acquisition section 101 acquires a signal via an unshown channel such as terrestrial digital broadcasting, satellite digital broadcasting, CATV network, the Internet or other network, supplying the signal to the channel decoding section 102.

The channel decoding section 102 subjects the signal acquired by the acquisition section 101 via the channel to channel decoding including error correction, supplying the resultant signal to the source decoding section 103.

The source decoding section 103 decompresses the compressed information of the signal, that has been subjected to the channel decoding, back to its original form, performing source decoding including the acquisition of data to be sent.

That is, the signal acquired by the acquisition section 101 via the channel may be compression-coded to compress information in order to reduce the size of information such as image and audio. In this case, the source decoding section 103 subjects the channel-coded signal to source coding that includes decompressing the compressed information to its original size.

It should be noted that if the signal acquired by the acquisition section 101 via the channel is not compression-coded, the source decoding section 103 does not decompress the compressed information to its original size. Here, among examples of decompression is MPEG decoding. On the other hand, the source decoding may include not only decompression but also descrambling.

For example, the A/D conversion circuits 11-1 and 11-2, digital demodulation circuit 12 and error correction/decoding circuit 13 of the receiver 1 shown in FIG. 1 correspond to the channel decoding section 102, and the speed adjustment buffer 14 and MPEG decoder 15 correspond to the source decoding section 103.

The reception system shown in FIG. 7 is applicable, for example, to a television tuner adapted to receive digital television broadcasting. It should be noted that each of the acquisition section 101, channel decoding section 102 and source decoding section 103 can be configured as a single independent device (hardware (e.g., IC (Integrated Circuit)) or software module).

Alternatively, the acquisition section 101, channel decoding section 102 and source decoding section 103 can be combined into a single independent device. Still alternatively, the acquisition section 101 and channel decoding section 102 can be combined into a single independent device. Still alternatively, the channel decoding section 102 and source decoding section 103 can be combined into a single independent device.

Figure 8:
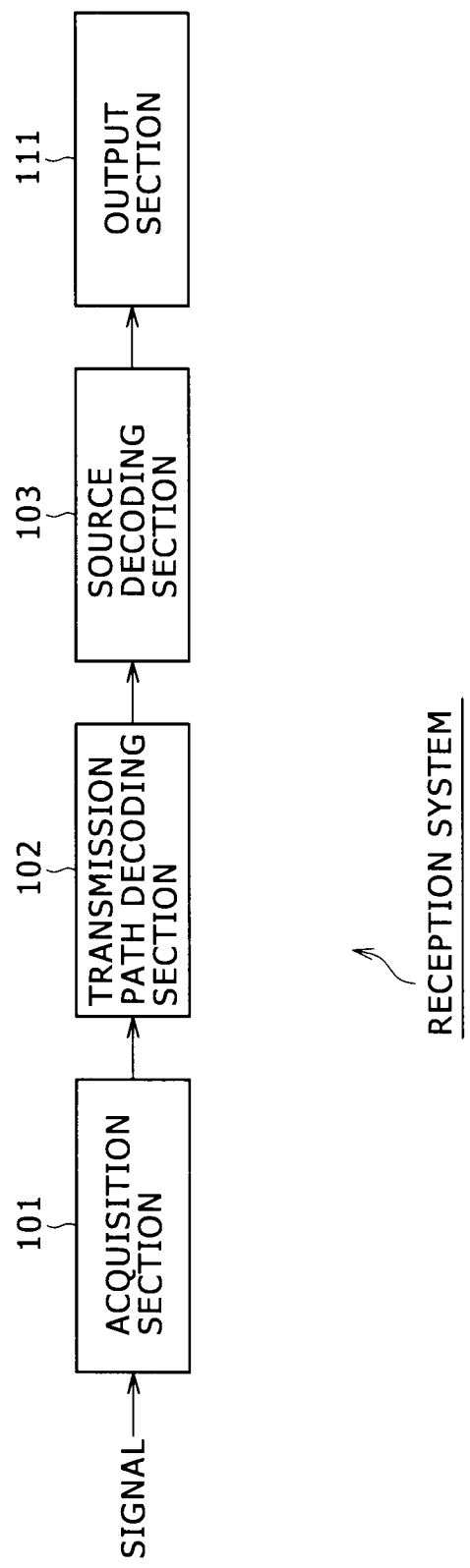
FIG. 8 is a block diagram illustrating a configuration example of the reception system according to a second embodiment.

FIG. 8 is a block diagram illustrating a configuration example of the reception system according to a second embodiment to which the receiver 1 is applied.

In FIG. 8, like components to those shown in FIG. 7 are denoted by the same reference numerals, and the description thereof is omitted as appropriate.

The configuration of the reception system shown in FIG. 8 is common to that shown in FIG. 7 in that the reception system includes the acquisition section 101, channel decoding section 102 and source decoding section 103 and differs therefrom in that an output section 111 is added.

The output section 111 is, for example, a display device adapted to display an image or a speaker adapted to produce an audio and outputs an image or audio as the signal output from the source decoding section 103. That is, the output section 111 displays an image or produces an audio.

The reception system shown in FIG. 8 is applicable, for example, to a television set adapted to receive digital television broadcasting or radio receiver adapted to receive radio broadcasting.

It should be noted that if the signal acquired by the acquisition section 101 is not compression-coded, the signal output from the channel decoding section 102 is supplied directly to the output section 111.

FIG. 9 is a block diagram illustrating a configuration example of the reception system according to a third embodiment to which the receiver 1 is applied.

In FIG. 9, like components to those shown in FIG. 7 are denoted by the same reference numerals, and the description thereof is omitted as appropriate.

The configuration of the reception system shown in FIG. 9 is common to that shown in FIG. 7 in that the reception system includes the acquisition section 101 and channel decoding section 102 and differs therefrom in that the source decoding section 103 is not provided, but a recording section 121 is added.

The recording section 121 records (stores) the signal (e.g., MPEG TS packet), output from the channel decoding section 102, to a recording (storage) medium such as optical disk, harddisk (magnetic disk) or flash memory.

The reception system shown in FIG. 9 is applicable, for example, to a recorder adapted to record television broadcasting.

It should be noted that the source decoding section 103 may be provided so that the recording section 121 records the signal that has been subjected to source decoding by the source decoding section 103, i.e., an image or audio obtained by the decoding.

It should be noted that the above series of processes may be performed by hardware or software. If the series of processes are performed by software, the program making up the software is installed from a program recording medium to a computer incorporated in dedicated hardware, a general-purpose personal computer or other computer.

FIG. 10 is a block diagram illustrating a hardware configuration example of a computer adapted to perform the above series of processes using a program.

A CPU (Central Processing Unit) 151, ROM (Read Only Memory) 152 and RAM (Random Access Memory) 153 are connected to each other via a bus 154.

An I/O interface 155 is also connected to the bus 154. An input section 156 and output section 157 are connected to the I/O interface 155. The input section 156 includes, for example, a keyboard and mouse. The output section 157 includes, for example, a display and speaker. Further, a storage section 158, communication section 159 and drive 160 are connected to the I/O interface 155. The storage section 158 includes, for example, a harddisk or non-volatile memory. The communication section 159 includes, for example, a network interface. The drive 160 drives a removable medium 161.

In the computer configured as described above, the CPU 151 loads the program from the storage section 158 into the RAM 153 for execution via the I/O interface 155 and bus 154, thus allowing for the above series of processes to be performed.

The program executed by the CPU 151 can be supplied recorded, for example, on the removable medium 161 or supplied via a wired or wireless transmission medium such as local area network, the Internet or digital broadcasting, after which the program is installed to the storage section 158.

The program executed by the computer may perform the processes not only chronologically according to the described sequence but also in parallel or when necessary as when invoked.

The embodiments of the present disclosure are not limited to those described above but may be modified in various ways without departing from the scope of the present disclosure.

The present disclosure contains subject matter related to that disclosed in Japanese Priority Patent Application JP 2010-202599 filed in the Japan Patent Office on Sep. 10, 2010, the entire content of which is hereby incorporated by reference.

What is claimed is:

1. A receiver comprising:
    a demodulation circuit configured to demodulate data and Transmission and Multiplexing Configuration Control (TMCC) information defined in ARIB STD-B44 attached to the data; and
    an extraction circuit configured to extract a subset of data from an entirety of the TMCC information, wherein
    the demodulation circuit performs demodulation according to the extracted subset of data,
    the TMCC information includes parameters for transmission of the data,
    the data is multiplexed data obtained by multiplexing program data of a plurality of channels,
    the TMCC information includes a parameter for multiplexing of the multiplexed data, and the extraction circuit extracts the subset of data from the entire TMCC information, the subset of data being larger in size than the parameters for transmission and that for multiplexing combined.

2. The receiver of claim 1 further comprising:
a separation circuit configured to separate the multiplexed data according to the parameter for multiplexing included in the extracted subset of data.

3. The receiver of claim 1, wherein
the parameters for transmission and the parameter for multiplexing are transmission mode/slot information included in the TMCC information.

4. The receiver of claim 1, wherein
the extraction circuit outputs the extracted subset of data to a circuit provided at a later stage of the signal path.

5. A reception method comprising:
demodulating data and Transmission and Multiplexing Configuration Control (TMCC) information defined in ARIB STD-B44 attached to the data;
extracting a subset of data from an entirety of the TMCC information; and
demodulating the data and control information according to the extracted subset of data, wherein
the TMCC information includes parameters for transmission of the data,
the data is multiplexed data obtained by multiplexing program data of a plurality of channels,
the TMCC information includes a parameter for multiplexing of the multiplexed data, and
the extracting includes extracting the subset of data from the entire TMCC information, the subset of data being larger in size than the parameters for transmission and that for multiplexing combined.

6. A non-transitory computer readable medium including a program, which when executed by a computer, causes the computer to:
demodulate data and Transmission and Multiplexing Configuration Control (TMCC) information defined in ARIB STD-B44 attached to the data;
extract a subset of data from an entirety of the TMCC information; and
demodulate the data and control information according to the extracted some data, wherein
the TMCC information includes parameters for transmission of the data,
the data is multiplexed data obtained by multiplexing program data of a plurality of channels,
the TMCC information includes a parameter for multiplexing of the multiplexed data, and
the extracting includes extracting the subset of data from the entire TMCC information, the subset of data being larger in size than the parameters for transmission and that for multiplexing combined.

* * * * *